July 27, 1965 W. H. WEDGER ETAL 3,197,350
METHOD OF BONDING WITH ADHESIVE AND ADHESIVE
CONTAINING AN INDICATOR
Filed May 4, 1961
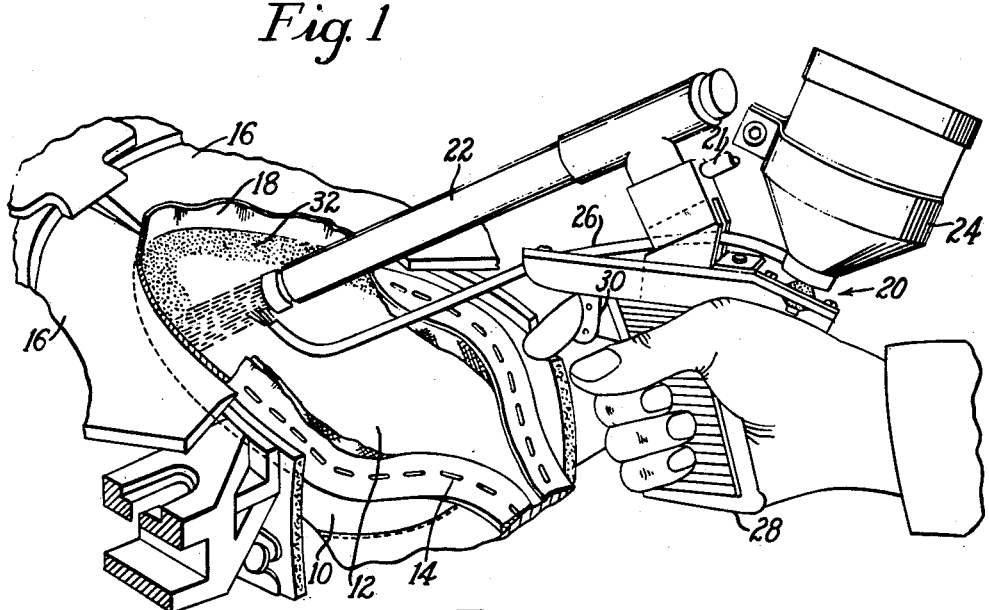
Fig. 1
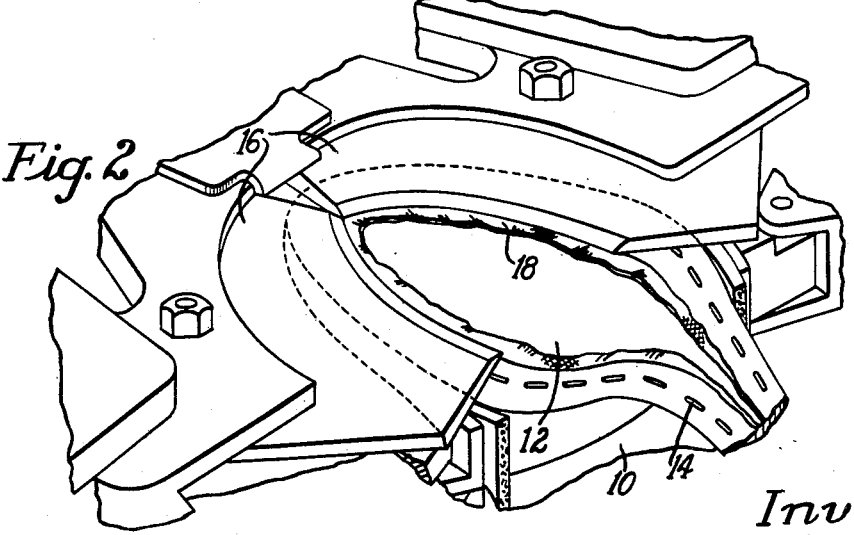
Fig. 2
Inventors
Walter H. Wedger
Ernest M. Crowell
By their Attorney

United States Patent Office 3,197,350
Patented July 27, 1965

3,197,350
METHOD OF BONDING WITH ADHESIVE AND ADHESIVE CONTAINING AN INDICATOR
Walter H. Wedger, Hamilton, and Ernest M. Crowell, Beverly, Mass., assignors, by mesne assignments, to United Shoe Machinery Corporation, Boston, Mass., a corporation of New Jersey
Filed May 4, 1961, Ser. No. 107,813
7 Claims. (Cl. 156—64)

This invention relates to an adhesive and method of bonding with the adhesive, and particularly to an adhesive and method of bonding wherein an indicator factor forms a part of the adhesive composition.

In the copending application of Walter H. Wedger, one of the present inventors, entitled "Adhesives and Methods of Bonding," Serial No. 86,131, now U.S. Patent No. 3,076,214 filed January 31, 1961, there is disclosed an adhesive method and adhesive in which finely divided fusible material is introduced into a stream of heated gas which softens, deposits and brings to activated condition the particles of adhesive so that a surface pressed against the deposited adhesive will be strongly held. An important advantage of this method is that the fusible mateal is brought so rapidly up to softened and activated temperature that it is not degraded by the heat and that a very small quantity of adhesive relative to that previously required for comparable bonding may be used.

The ability of very small quantities of adhesive to form bonds by this method has presented the problem, particularly with the desirable transparent or light colored adhesives, that it has been extremely difficult to determine the quantity, location and state of activation of the adhesive deposited. Because of this, amounts of adhesive in excess of those required have been used.

It is an object of the present invention to provide a finely divided adhesive and an adhesive method involving use of the adhesive in which the adhesive when introduced into a stream of hot gas, will deposit on a surface a thin layer of adhesive whose position, quantity and state of activation are readily perceptible.

To these ends, and in accordance with a feature of the present invention, there is mixed with a finely divided heat fusible adhesive a small amount of finely divided coloring material compatible with the adhesive, that is capable of solution in, or ready wetting by the adhesive material in molten state. In use of this adhesive, it is observed that the diffraction from the many surfaces existing in the finely divided adhesive composition will, in general, give an opaque, usually whitish effect in which the colored or black material (hereinafter referred to as "coloring material") is masked to a considerable extent, but that when deposited and melted to coalesce the particles into a fluid band on a surface the coloring material imparts a readily perceptible color or darkening of the band so that even a very thin band is perceptible. The development of this coloring through elimination of the light diffracting surfaces of the coalesced adhesive particles is a clear indication of satisfactory reduction of the deposited material to fluid condition for wetting and adhesion to surfaces.

The bonding process and special adhesive are particularly adapted for cement shoe toe lasting processes, and the invention will be described more fully for this use; but it will be understood that the process and adhesive are useful in other relations.

Reference is made to the drawings forming part of the disclosure of the present invention in which, FIG. 1 is an angular view of the forepart of a shoe the sides of which have been lasted and the lasting margin of the lining and toe box trimmed away and also showing the adjacent portions of a lasting machine, and showing the application of powdered adhesive at the joint between the insole and the lasting margin of the upper; and FIG. 2 is a similar view showing the wipers of the lasting machine in closed position in which they have wiped over the lasting margin and pressed it against the insole.

Effecting action of the new adhesive and process to provide the novel indicator effect to signal the completion of deposition and activation of adhesive depends on a novel use of the physical and optical properties of the finely divided adhesive composition. In general, it appears that an opaque or white appearance due to light diffraction increases with the fineness of division of the adhesive particles so that with particles not substantially larger than that size which will pass a 60-mesh standard sieve, a substantial proportion of coloring material may be incorporated without markedly darkening the mass. Particles of a size capable of passing this sieve also possess the desired ability to be softened to condition for adherence to a surface against which they are carried by a hot gas stream and are effectively softened to a fluid condition capable of coalescing to a fluid layer and of wetting and adhering to surfaces brought in contact with them. Particles significantly above this size lack the desired initial whiteness or opacity and the ability rapidly to be softened and activated. Also such larger particles are not effectively colored when deposited on a surface because effective uniform dispersion or solution of the coloring material through the larger units of adhesive represented by larger particles does not readily occur.

Tough fusible components useful in the present adhesive and method may be the linear resinous polyesters or co-polyesters of terephthalic acid and isophthalic acid with glycols of the series $HO(CH_2)_nOH$ (where "$n$" is is an integer greater than 1 but not exceeding 10) as disclosed in the co-pending application of Ernest M. Crowell one of the present inventors entitled "Adhesive Bonding Process and Adhesive Bodies," Serial No. 826,152, now U.S. Patent No. 3,090,772 filed July 10, 1959. Other heat softenable resins, such as the polyamides, polystyrene and other vinyl polymer and copolymer resins, e.g., polyvinyl chloride may be used. These resins are relied on as the primary strength-giving component of the adhesive and in general should be of high molecular weight and of a melting point sufficiently high to withstand the temperatures to which the bond will be subjected.

Coloring materials for cooperation with the fusible adhesive particles may be pigments or dyes which will retain their coloring ability at the temperatures to which the adhesive composition is subjected in use and which will be compatible with, that is wetted by or soluble in the adhesive. Examples of suitable indicator materials for the polyester or copolyester resin based adhesives are pigments such as carbon black and various mineral pigments which do not react adversely with the resinous components, for example, chromium oxide, iron oxide, cadmium red, and the like. Metallic powder type pigment material may also be used where it is not adversely reactive with the resin. In particular, flake aluminum pigment has been found effective not only as an indicator but also apparently as a heat absorber giving improved take-up of heat so that more rapid deposition and activation of the adhesive is possible. Dyes, such as "Resoform Brown B. R. Pure," "Natural Oil Brown" and others which are soluble in the molten adhesive are also useful. It is also possible to use a proportion of a resin useful as an adhesive assistant, described in the Wedger application, as a coloring or darkening agent where the color of the resin is sufficiently intense.

In general, the coloring material will be incorporated as a finely divided or powdered material mixed dry with the finely divided adhesive base. It will be understood, of course, that the indicator material may be applied as a dispersion or solution in a volatile liquid non-solvent for the adhesive base particles, followed by evaporation of the liquid. However, it appears that the product of mixing powders gives greater contrast between fused and unfused material.

The percentage of indicator for the action required is, in general, rather small, and effective indicator action has been obtained with as little as 0.02% of a dye or about 0.2% of a strongly colored pigment. With regard to the metallic pigment, indicator action is obtained with a percentage as low as ¼%, but it appears that the improvement in heat absorption of the adhesive composition is best in the range of from about ¼% to about 2%, preferably from about ½% to 1% of metallic pigment, such as aluminum flake pigment.

The adhesive composition may comprise a low melting component at least partially miscible with the higher melting basic resin of the adhesive. The low melting component improves the ability of the adhesive to adhere to a surface against which the stream of hot gas and adhesive particles is directed and aids in softening the base adhesive to a fluid condition in which it can wet or penetrate the surface to be bonded and coalesce more rapidly to continuous film, as described in the first of the copending applications above referred to. Where such lower melting components are used, they will be used in the proportions taught in that copending application, namely, from about 5% to about 20% by weight of the relatively low melting component with from about 95% to about 80% by weight of tough, high melting component.

In the bonding method using the present adhesive, the adhesive powder is introduced into a stream of hot gas and deposited on a surface to be bonded. In passing to the surface, the particles are heated to a point in which the surfaces of the particles of adhesive are softened and rendered capable of adhering to that surface. The hot gas stream and powdered adhesive are directed along an area to be bonded at a rate and a temperature such that the deposited adhesive particles form a fused-together substantially continuous film of fluid adhesive, the development of the desired fluidity being evidenced by a change from a whitish, difficultly observable appearance immediately on deposition to a darkened or colored appearance when the effect of the hot gas has caused coalescence of the particles into a continuous film. The whitish initial appearance is due to the diffraction of light by the irregular surface of the as yet unmelted or only partially melted adhesive particles. The colored appearance is due to the devolpment of a substantially transparent continuous film where the surface does not present the numerous diffracting irregularities so that the coloring action of the pigment or dye becomes apparent. While the adhesive is still hot and capable of establishing a bond, the second surface is pressed down on the hot adhesive.

In carrying out the bonding process for the lasting portion of shoe uppers, for example, toe portions, using the new powdered adhesives, a shoe upper 10 and insole 12 are assembled on a last, pulled over, and the side, shank and rear portions lasted in any convenient manner, for example, with staples 14, along the sides of the shoe. The toe portion of the shoe 10 is usually subjected to a toe steaming operation to increase the moisture content and soften the shoe upper material, such as leather to facilitate lasting. The partially lasted shoe 10 is fitted to the bed lasting machine jack (not shown), the lasting wipers 16 for the toe end are adjusted and the operator pulls out any tacks which might interfere with the lasting. The toe portion is then subjected to preliminary lasting and wiping actions to take out stretch of the upper material and pull the upper 10 snugly to the toe of the last.

The margin 18 of the upper 10 is opened out and surplus lining and box toe material are trimmed away, for example by means of a hand knife.

Any convenient device may be used to apply the powdered adhesive, a preferred device 20 being that illustrated generally in FIG. 1 in which a gas such as air supplied under pressure to inlet tube 21 is forced through a hot tube 22 and emerges as a stream of gas at a temperature sufficient to raise the adhesive to bond forming temperature. Powdered adhesive is carried from a storage container 24 by a low velocity stream of air through a tube 26 and injected into the hot gas stream where the particles are entrained in and carried to the surface to be adhered by the gas stream. As shown in the figure, these elements may be mounted on a suitable handle 28 provided with a trigger device 30 for initiating or terminating operation.

The stream of hot air with the entrained particles of adhesive is directed at the joint between the lasting margin 18 of the shoe and the insole 12 and progressively deposits a layer 32 of heat softened particles along the insole 12.

After successive portions of the layer 32 are deposited they are further softened by heated air from the tube 22 in movement of the device 20 to form the next portions of the layer. It will be observed that the action of this heated air quickly converts the whitish initial appearance of the layer to a transparent colored state indicating the activated condition of the adhesive and masking out the areas which have an adequate deposit of adhesive. Promptly after deposition of the layer 32 of the adhesive, and while the adhesive is in heat softened condition, the lasting wipers 16 are actuated to wipe the margin 18 of the upper 10 over onto the insole 12.

The following examples are given as possible assistance in understanding the invention, but it is to be understood that the invention is not restricted to the materials, proportions or conditions of the examples.

*Example 1.*—A thermoplastic linear copolyester of 1.4 butane diol with isophthalic and terephthalic acid radicals in the ratio of .175 mols of isophthalic to .825 mols of terephthalic acid, having a melting point of about 194° C. was reduced to a white powder sufficiently fine to pass a 170 mesh standard sieve.

100 parts of the powdered copolyester resin were thoroughly mixed with 1 part by weight of powdered iron oxide pigment( Pure Indian Red) to form a pale lavender powder. This mixture was introduced into the powder storage compartment of an applying device 20 such as shown in FIG. 1. This device was adjusted to supply a stream of hot air at a temperature of 750° F. from the tube 22 and to inject powder from the powder storage 24 through the tube 26 into the hot gas stream. A partially lasted shoe 10 was fitted to the bed lasting machine jack and subjected to preliminary lasting and wiping actions to take out stretch of the upper material and pull the upper snugly to the toe of the last. The lasting margin 18 of the upper 10 was opened out and surplus lining and box toe materials were trimmed away. The applicator device 20 was then operated to direct a stream of hot air including entrained particles of the mixed resinous materials at the joint of the lasting margin 18 of the shoe 10 and insole 12. The device 20 was manipulated so that the stream of air was moved in the direction of the powdered adhesive supply tube 26. By this procedure the entrained powdered adhesive was softened before reaching the insole 12 to a condition at which it adhered to the insole 12 as a light colored layer 32, and the deposited material, within less than a second after deposition was brought to a condition in which the adhesive layer 32 was more fully softened and rendered fluid, as indicated by development of a violet color, by heated gas passing over the deposited adhesive. Promptly after the adhesive had been deposited over the portion of the insole on which the lasting margin 18 of the upper 10 was to be secured, the lasting wipers 16 were actuated to wipe the margin 18 of the upper 10 onto the insole 12. On release of the lasting wipers 16, it was found that an excellent job of lasting had been accomplished in which the lasting margins were strongly and smoothly held against the insole.

*Example 2.*—A novolak type resorcinol fomaldehyde resin having a softening point B. and R. of 103° to 112° C. was ground to a fineness capable of passing a 200 mesh standard sieve. The resin has a reddish amber color in lump form and is a light tan or cream color in powder form. 15 parts of the resorcinol resin particles were blended uniformly with 85 parts by weight of particles of the copolyester resin, described in Example 1, forming a very light cream colored mixture. This powder mixture was used in the toe lasting procedure described in Eaxmple 1. The initially deposited material in the layer 32 was light yellow but promptly developed an orange color when fused by hot air from the gun. Development of the color indicated the location of the deposited adhesive and its fusion to bond forming condition. After lasting of the shoe, a strong tight bond was found to have been made.

*Example 3.*—100 parts by weight of the powdered copolyester resin described in Example 1 were thoroughly mixed with ⅒ part by weight of a finely powdered brown dye ("Resoform Brown B.R. Pure") to form a very pale pastel brown powder. This powder mixture was used in the toe lasting procedure described in Example 1. The initially deposited material in the layer 32 was scarcely visible against the insole, a light brown fiber insole, but quickly developed a very deep purple color as the resin particles were fused by hot air from the gun. Development of the color indicated the location of the deposited adhesive and its fusion to bond forming condition. After lasting of the shoe, an excellent bond was found to have been made between the upper material and the insole.

*Example 4.*—100 parts by weight of the powdered copolyester resin described in Example 1 were thoroughly mixed with about ¾ part by weight of very fine pigment aluminum flake to form a faintly grayish powder. This powder mixture was used in the toe lasting procedure described in Example 1. The initially deposited material in the layer 32 was light colored and difficult to see against a light colored insole but almost immediately developed a dark grayish appearance as the resin particles were fused by hot air from the gun. The development of color occurred in a shorter time than did the development of color in the adhesives deposited in the other examples and clearly indicated the location of the deposited adhesive and its fusion to bond forming condition. After lasting of the shoe, it was found that the lasting margins of the upper were strongly and smoothly held against the insole.

Having thus described our invention, what we claim as new and desire to secure by Letters Patent of the United States is:

1. A method for bonding surfaces together comprising the steps of providing a mixture of heat fusible substantially solvent-free resin adhesive particles and finely divided coloring material which will retain its coloring ability at the temperature to which the adhesive composition is subjected in use and which is compatible with said adhesive uniformly distributed through the mass of particles, said particles and coloring material being in physically distinct but closely adjacent spaces, said mixture being opaque and masking the presence of said coloring material through diffraction of incident light by the surfaces of the adhesive particles, directing against a first surface to be bonded a stream of heated gas and entrained particles of said mixture, softening said adhesive particles by said heated gas, depositing heat softened particles from said gas stream as an adherent, whitish, difficultly observable layer on said first surface, fusing the particles of resin adhesive in said layer by directing heated gas at the layer to convert the resin adhesive into a fluid in which individual particles have merged to eliminate internal and external light diffracting surfaces of said particles and the coloring material is no longer masked by diffracting particle surfaces but colors the fluid to render its position readily perceptible and to indicate that the adhesive has been heat softened to bond forming condition, pressing a second surface against said adhesive layer to force the heat softened material into intimate contact with both of said surfaces, and solidifying the adhesive.

2. A method for bonding surfaces together comprising the steps of providing a mixture of heat fusible substantially solvent-free resin adhesive particles not over 0.25 mm. in dimension with from 0.02% to about 1% by weight based on the weight of said adhesive particles of finely divided pigment of the class consisting of carbon black and mineral pigments which will retain their coloring ability at the temperature to which the adhesive composition is subjected in use and which are wettable by said adhesive in molten condition, said pigment being uniformly distributed through the mass of particles, said particles and said pigment being in physically distinct but closely adjacent spaces, and said mixture being opaque and masking the presence of said pigment through diffraction of incident light by the surfaces of the adhesive particles, directing against a first surface to be bonded a stream of heated gas and entrained particles of said mixture, softening said adhesive particles by said heated gas, depositing heat softened particles from said gas stream as an adherent, whitish, difficultly observable layer on said first surface, fusing the particles of resin adhesive in said layer by directing heated gas at the layer to convert the resin adhesive into a fluid in which the individual particles have merged to eliminate light diffracting surfaces of said particles and the pigment is no longer masked by diffracting particle surfaces but colors the fluid to render its position readily perceptible and to indicate that the adhesive has been heat softened to bond forming condition, pressing a second surface against said adhesive layer to force the heat softened material into intimate contact with both of said surfaces, and solidifying the adhesive.

3. A method for bonding surfaces together comprising the steps of providing a mixture of heat fusible substantially solvent-free resin adhesive particles not over about 0.25 mm. in dimension with from about ¼% to about 2% by weight based on the weight of said adhesive particles of aluminum flake pigment uniformly distributed through the mass of particles, said particles and coloring material being in physically distinct but closely adjacent spaces, said mixture being opaque and masking the presence of said pigment through diffraction of incident light by the surfaces of the adhesive particles, directing against a first surface to be bonded a stream of heated gas and entrained particles of said mixture, softening said adhesive particles by said heated gas, depositing heat softened particles from said gas stream as an adherent, whitish, difficultly observable layer on said first surface, fusing the particles of resin adhesive in said layer by directing heated gas at the layer to convert the resin adhesive into a fluid in which the individual particles have merged to eliminate light diffracting surfaces of said particles and the pigment is no longer masked by diffracting particle surfaces but colors the fluid to render its position readily perceptible and to indicate that the adhesive has been softened to bond forming condition, pressing a second surface against said adhesive layer to force the heat softened material into intimate contact with both of said surfaces, and solidifying the adhesive.

4. A method for bonding surfaces together comprising the steps of providing a mixture of heat fusible substantially solvent-free resin adhesive particles not over about 0.25 mm. in dimension with from about .02% to about 1% by weight based on the weight of said adhesive particles of finely divided dye which will retain its coloring ability at the temperature to which the adhesive composition is subjected in use and which is uniformly distributed through the mass of particles, said particles and said dye being in physically distinct but closely adjacent spaces, said dye being soluble in said adhesive when said adhesive is in molten condition, said mixture being opaque and masking the presence of said dye through diffraction of incident light by the surfaces of the adhesive directing against a first surface to be bonded, a stream of heated gas and entrained particles of said mixture, softening said adhesive particles by said heated gas, depositing heat softened particles from said gas stream as an adherent, whitish, difficultly observable layer on said surface, fusing the particles of resin adhesive in said layer by directing heated gas at the layer to convert the resin adhesive into a fluid in which the individual particles have merged to eliminate light diffracting surfaces of said particles and in which the dye is no longer masked by diffracting particle surfaces and dissolves in and colors the fluid to render its position readily perceptible and to indicate that the adhesive has been heat softened to bond forming condition, pressing a second surface against said adhesive layer to force the heat softened material into intimate contact with both of said surfaces, and solidifying the adhesive.

5. A thermoplastic adhesive composition comprising a mixture of particles of heat fusible substantially solvent-free resin adhesive not over about 0.25 mm. in dimension, said mixture including from about .02% to about 2% by weight based on the weight of said adhesive particles of finely divided coloring material which will retain its coloring ability at the temperature to which the adhesive composition is subjected in use and which is compatible with said adhesive uniformly distributed through the mass of particles, said particles and coloring material being in physically distinct but closely adjacent spaces, said mixture being opaque and masking the presence of said coloring material due to diffraction of light by the surfaces of the adhesive particles, and said adhesive being freely fluid in molten condition for coalescence of particles of said adhesive into a fluid layer with elimination of internal and external light diffracting surfaces of said coalesced particles, said coloring material not being masked by diffracting particle surfaces after said coalescence but coloring the heat activated adhesive mass to indicate conversion of the adhesive to bond forming condition.

6. A thermoplastic adhesive composition comprising a mixture of particles of heat fusible substantially solvent-free resin adhesive, said adhesive being transparent in thin sections and said particles being not over 0.25 mm. in dimension, said mixture including from about ¼% by to about 1% by weight based on the weight of said adhesive particles of finely divided pigment of the class consisting of carbon black and mineral pigments which will retain their coloring ability at the temperature to which the adhesive composition is subjected in use and which are wettable by said adhesive in molten condition uniformly distributed through the mass of particles, said particles and said pigment being in physically distinct but closely adjacent spaces, said mixture being opaque and masking the presence of said pigment due to diffraction of light by the surfaces of the adhesive particles, and said adhesive being freely fluid in molten condition for coalescence of particles of said adhesive into a fluid layer with elimination of internal and external light diffracting surfaces of said coalesced particles, said pigment not being masked by diffracting particle surfaces after said coalescence but coloring the heat activated adhesive mass to indicate conversion of the adhesive to bond forming condition.

7. A thermoplastic adhesive composition comprising a mixture of particles of substantially solvent-free heat fusible resin adhesive, said adhesive being transparent in thin sections and said particles being not over about 0.25 mm. in dimension, said mixture including from .02% by weight to about 1% based on the weight of said adhesive particles of finely divided dye which will retain its coloring ability at the temperature to which the adhesive composition is subjected in use and which is uniformly distributed through the mass of particles, said particles and said dye being in physically distinct but closely adjacent spaces, said dye being soluble in said adhesive when said adhesive is in molten condition, said mixture being opaque and masking the presence of said dye due to diffraction of light by the surfaces of the adhesive particles, and said adhesive being freely fluid in molten condition for coalescence of particles of said adhesive into a fluid layer with elimination of internal and external light diffracting surfaces of said coalesced particles, said dye not being masked by diffracting particle surfaces after said coalescence but coloring the heat activated adhesive mass to indicate conversion of the adhesive to bond forming condition.

References Cited by the Examiner

UNITED STATES PATENTS

| | | | |
|---|---|---|---|
| 1,667,689 | 4/28 | Grupe | 156—247 |
| 1,990,803 | 2/35 | Thompson | 12—145 |
| 2,108,998 | 2/38 | Schori | 239—85 |
| 2,405,602 | 8/46 | Nugent | 156—64 |
| 2,423,869 | 7/47 | Blessing | 156—332 |
| 2,481,602 | 9/49 | Lindh | 156—290 |
| 2,726,118 | 12/55 | Jones et al. | 239—85 |
| 2,758,983 | 8/56 | Toulmin | 260—40 |
| 2,961,365 | 11/60 | Sroog | 156—332 XR |
| 3,076,214 | 2/63 | Wedger | 156—233 |
| 3,090,772 | 5/63 | Crowell | 156—332 |

FOREIGN PATENTS 558,111   12/43   Great Britain.

EARL M. BERGERT, *Primary Examiner.*